United States Patent [19]
Ataka

[11] 3,752,575
[45] Aug. 14, 1973

[54] OVERHEAD PROJECTOR

[75] Inventor: Hisanori Ataka, Kawasaki-shi, Japan

[73] Assignee: Ricoh Co. Ltd., Tokyo, Japan

[22] Filed: Oct. 16, 1972

[21] Appl. No.: 297,747

Related U.S. Application Data

[63] Continuation-in-part of Ser. No. 47,102, June 17, 1970, abandoned.

[30] Foreign Application Priority Data

June 17, 1969 Japan.............................. 44/57230

[52] U.S. Cl..................................... 353/38, 353/98
[51] Int. Cl....................... G03b 21/14, G03b 21/28
[58] Field of Search................... 353/38, 98, 99, 122

[56] References Cited
UNITED STATES PATENTS

| | | | |
|---|---|---|---|
| 2,596,049 | 5/1952 | Geizen | 350/211 |
| 3,004,470 | 10/1961 | Ruhle | 350/211 |
| 3,293,982 | 12/1966 | Appeldorn | 353/38 |

*Primary Examiner*—Louis R. Prince
*Assistant Examiner*—A. M. Mirabito
*Attorney*—Henry T. Burke et al.

[57] ABSTRACT

An improved overhead projector capable of employing a smaller sized reflecting mirror, thereby making the projector compact in size, wherein a Fresnel condenser lens system, which serves as the stage or is disposed adjacent to a stage, comprises at least two Fresnel lenses having different widths and/or different focal lengths so that the light beams refracted by the different Fresnel lenses may be made incident at different angles upon the projection lens and thus upon the surface of the reflecting mirror, particularly the upper half portion, thereby permitting the reflecting mirror to be shortened. Individual light sources may be used for respective Fresnel lenses so that they may be moved closer together further decreasing the size of the projector.

3 Claims, 8 Drawing Figures

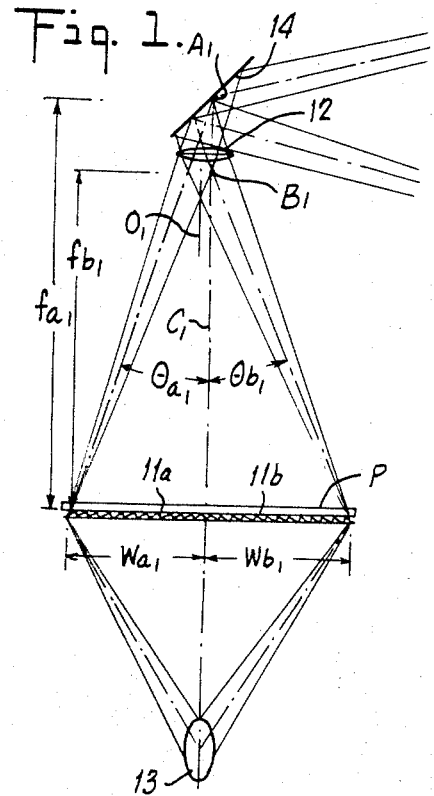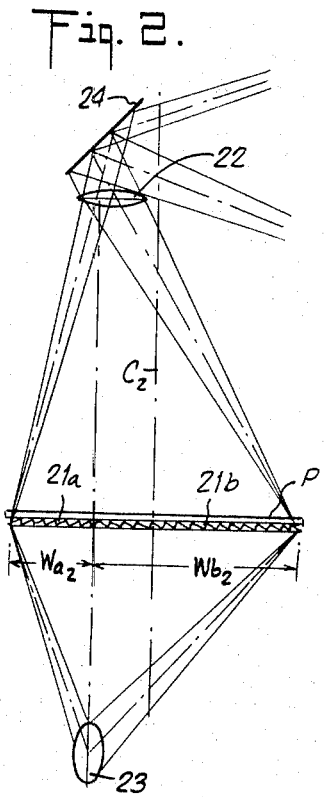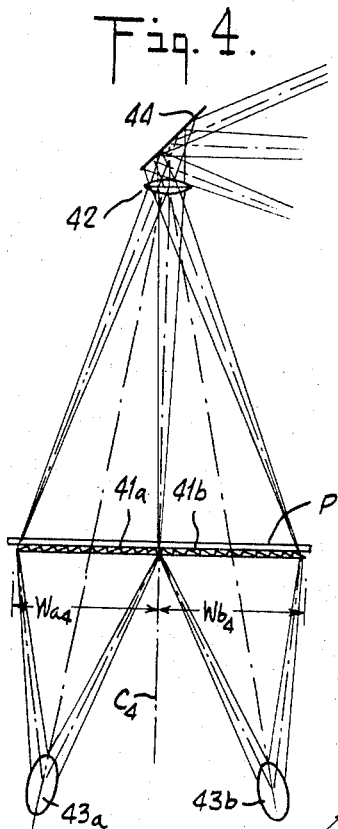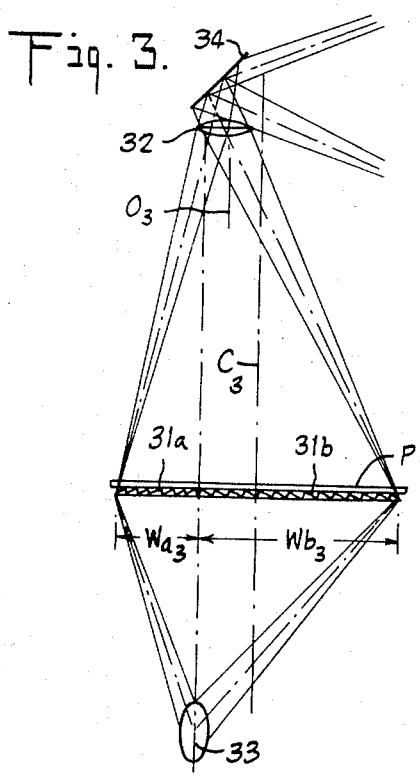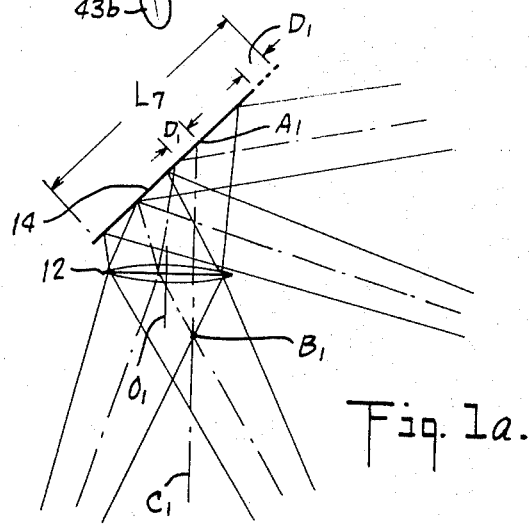

3,752,575

OVERHEAD PROJECTOR

CROSS-REFERENCE

This is a continuation-in-part application based on my copending application, Ser. No. 47,102, now abandoned filed on June 17, 1970 with Claim of Priority based on Japanese Patent application Ser. No. 57230/1969, filed on June 17, 1969.

BACKGROUND OF THE INVENTION

The present invention relates to an overhead projector and more particularly, to an improved optical system therefor.

In the conventional overhead projector, a reflecting mirror is disposed with its surface at an angle relative to the optical axis of a light image directing projection lens in order to redirect the light beams from the lens to a screen disposed laterally of the mirror and lens. With such an arrangement the upper or front portion of the reflecting mirror above the intersection with the optical axis has inevitably been longer than the lower or back portion. If the reflecting mirror could be made compact in size in such a manner that the length of the upper portion may be made substantially equal to that of the lower portion, the reflecting mirror could be reduced in size considerably, thus leading to the miniaturization of the overhead projector as a whole.

SUMMARY OF THE INVENTION

The present invention provides an improved optical system for overhead projectors wherein a small-sized reflecting mirror may be used, thereby making the projector compact in size.

In brief, the present invention provides a projector with an improved Fresnel condenser lens system comprising at least two Fresnel lenses, whose widths in the direction of the inclined axis of the mirror and/or focal lengths are different from each other, and wherein the positions of the projection lens, the reflecting mirror and the light source or sources may be offset from the center line of the Fresnel center line of the Fresnel condenser lens system. More particularly, the projection optical system in accordance with the present invention comprises the combination of a Fresnel condenser lens system of the character described above with the axes of the reflecting mirror, the projection lens and the light source or sources, offset so that the light beams from the light sources may be made incident at such different angles of incidence upon the projection lens that they may be redirected toward the viewing screen by a small-sized reflecting mirror, which has been hitherto impossible by the conventional projection optical system.

When an independent light source is employed for each of the Fresnel lenses, the distance between the lens and source may be reduced so that the overhead projectors may be further made compact in size, since when a plurality of light sources are employed, the incident angles of the respective light rays on the reflecting mirror can be made equal to those from a single light source by bringing the light sources near the Fresnel condenser lenses.

The above and other features and advantages of the present invention become more apparent from the following description of the preferred embodiments thereof taken in conjunction with the accompanying drawing.

BRIEF DESCRIPTION OF THE DRAWINGS

FIG. 1 is a diagrammatic view illustrating a preferred embodiment of the present invention;

FIG. 2 is a diagrammatic view illustrating an alternate embodiment of the present invention;

FIG. 3 is a diagrammatic view illustrating a further embodiment of the present invention;

FIGS. 4, 5 and 6 are respective views as in FIGS. 1,2 and 3 illustrating the use of multiple light sources therewith.

PRIOR ART

Figure 7:
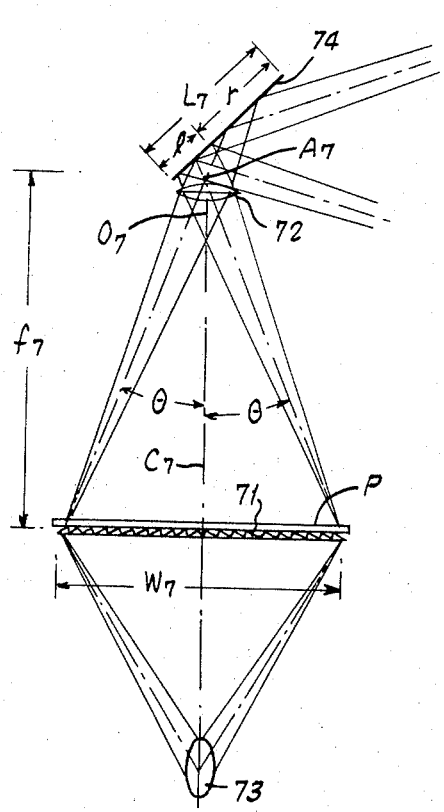
FIG. 7 is a diagrammatic view illustrating one example of the conventional overhead projector or writescope for comparison.

Referring to FIG. 7, illustrating one conventional overhead projector, light beams from a light source 73 are refracted by a single Fresnel lens 71, of width $w_7$ on which a slide or picture P to be projected is placed and focused at $A_7$ upon the central axis $C_7$. In this case, the half angles $\theta$ of a given cone of light are the same. A projections lens 72 with its optical axis $O_7$ in coincidence with the central axis $C_7$ of the Fresnel lens 71 focuses the image of the picture P on a reflecting mirror 74 whose plane is inclined with respect to the axis $O_7$, $C_7$ so as to project the image onto a viewing screen 75 located to the right in the Figure. In consequence, the forward or right half portion r of the reflecting mirror 74 above the intersection of the axis $O_7$, $C_7$ with the reflecting mirror surface must be made longer than that of the backward or left half portion L as is clearly seen from FIG. 7. The full length of the mirror 74 is $L_7$. If the reflecting mirror 74 is made proportionally smaller in size, the light beams from areas around the edges of the Fresnel lens 71, will not be reflected by the reflecting mirror 74, so that loss of light through the optical elements occurs inevitably. Thus, it is impossible to miniaturize the reflecting mirror 74 and the overhead projector with such an arrangement.

DESCRIPTION OF THE PREFERRED EMBODIMENTS

The present invention therefore provides an improved overhead projector capable of employing a small-sized reflecting mirror without causing any loss of light through the optical elements. It should be kept in mind for the purposes of the description that in overhead projectors Fresnel lenses are used for directing beams of light toward the reflecting mirror through the slide or picture placed thereon, and the distance between the projection lens and the picture is so adjusted that the image of the picture is focused on the screen, but not the image of the light source. The focal length of the Fresnel lens does not effect the position or focusing of the picture image but must be taken into consideration with regard to the focusing of the image of the light source on the screen.

FIRST EMBODIMENT, FIG. 1

In the first embodiment of the present invention, a Fresnel condenser lens system comprises front and back Fresnel lenses 11b and 11a, with respect to screen 16, each having the same width $w_{a1} = w_{b1}$ but a different focal length. In the instant embodiment, the focal length $f_{b1}$ of the front Fresnel lens 11b is made shorter than the focal length $f_{a1}$ of the back Fresnel lens 11a, length $f_{a1}$ being equal to length $f_7$. In such case $\theta_{b1} = \theta_{a1}$. As seen more clearly in FIG. 1 the optical axis $O_1$ of the projection lens 12 is offset slightly to the left of the central axis $C_1$ of the Fresnel condenser lens system or stage in the direction away from the screen 16 off to the right in the Figures. In the absence of the projection lens 12, which is somewhat larger than lens 72, the light beams from a light source 13 refracted by the back Fresnel lens 11a would be focused at the point $A_1$ on the central axis $C_1$ adjacent to reflecting mirror 14 while light beams refracted by front Fresnel lens 11b would be focused at the point $B_1$ upon the central axis and adjacent to the projection lens 12. However, as positioned, lens 12 causes light from Fresnel lens 11a to be refracted so as to fall lower on the surface of the mirror 14 as seen in FIG. 1a. The mirror 14 may thus be made smaller by a length $D_1$ than the mirror 74.

SECOND EMBODIMENT, FIG. 2

In the second embodiment, two Fresnel lenses 21 a and 21 b of the Fresnel condenser lens system have different apertures $w_{a2}$, $w_{b2}$, but the same focal lengths. A projection lens 22, a light source 23 and a reflecting mirror 24 are suitably offset to the left from the central axis $C_2$ of the Fresnel condenser lens system 21a, 21b. It will be seen that the angle of incidence of the light from the rear lens 21a on the projection lens 22 is greater than if the lens 22 were located on the central axis $C_2$ of the Fresnel lens system. Accordingly, the angle of incidence of this light on the mirror 24 will be greater so that the area of intersection between the light and the mirror surface is less than, for example, that shown in FIG. 7. The length of mirror 24 may therefore be reduced as in the first embodiment.

THIRD EMBODIMENT, FIG. 3

The third embodiment is substantially similar in arrangement to the second embodiment except that two Fresnel lenses 31a and 31b of the Fresnel condenser lens system have different apertures and different focal lengths. It will be seen that the aforementioned advantages can also be obtained.

FOURTH, FIFTH AND SIXTH EMBODIMENTS, FIGS. 4,5 AND 6

The fourth, fifth and sixth embodiments are substantially similar to the first, second and third embodiments respectively except that two light sources 43a and 43b; 53a and 53b; 63a and 63b, respectively, are employed so that their images are focused through their respective Fresnel lenses. When two light sources are used, the focal length of the Fresnel lens system may be made longer than when only one light source is used, and the beams of light may be more readily refracted toward the projecting lens. For a Fresnel lens system of a given focal length it will be seen that if two spaced light sources are used they may be brought closer to the Fresnel lens system than the case where a single light source is used. Consequently, the lamp house may be made more compact in size.

OPTICAL CHARACTERISTICS

By means of the above-mentioned offset optical axis arrangements, two light beams, either emitted at the same point from a single light source, or at different points from two light sources, and refracted by the two Fresnel lenses respectively may be made incident upon the projection lens at different angles relative to the optical axis thereof. As a result, the light beams through the left or back Fresnel lens are made incident upon the reflecting mirror at greater angles with respect to the surface of the mirror than those of the prior art projectors. In consequence, the reflecting mirror may be made compact in size without causing any loss of light through the optical elements and a highly uniform field may be attained. Further the mirror can be moved closer to the Fresnel lens system.

The two Fresnel lenses may be made into a unity construction if required.

Also in accordance with the present invention in a projector having projection lenses on the incoming axis and on the outgoing axis of the mirror, the diameters of the lenses may be made smaller. Further, a single prism can replace the mirror, or the mirror and the lenses can be made into a single piece without decreasing the light intensity. Thus it is possible to obtain a brighter projected image with such an arrangement.

Figure 5:
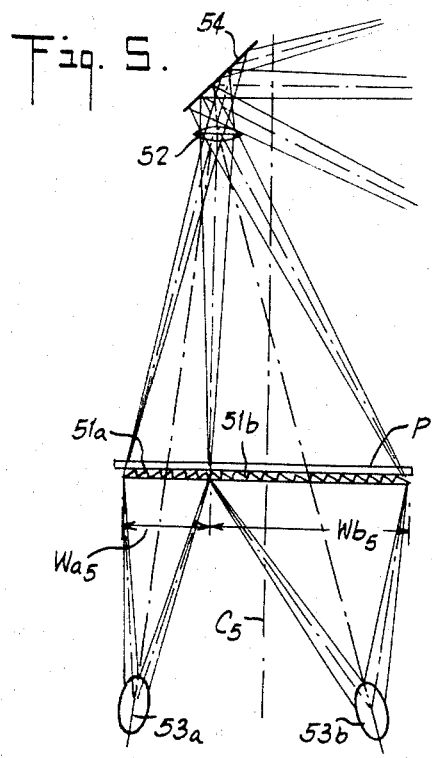
Figure 6:
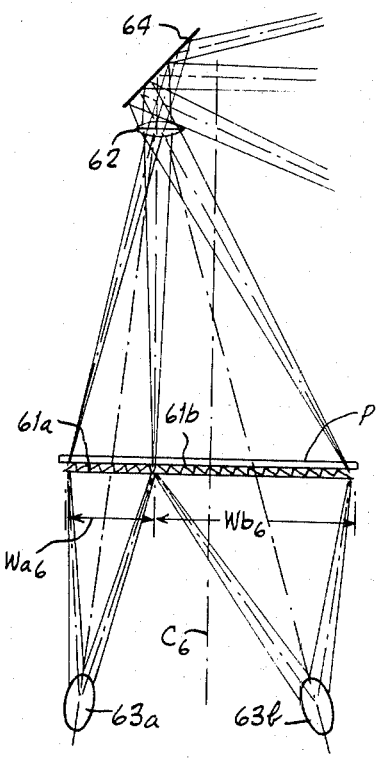

When two light sources are employed as shown in FIGS. 4–6, the distance between them and the Fresnel condenser lens system may be reduced, thus making the lamp house more compact in size.

What I claim is:

1. An overhead projector for projecting an image from an image-containing means onto a viewing means comprising:
   a. means for supporting said image-containing means including a Fresnel condenser lens system comprising at least two lenses having characteristic apertures and focal lengths, said lenses differing from each other in at least one of said characteristics, and respectively juxtaposed in the same plane front and rear with respect to said viewing means;
   b. projection lens means disposed on the opposite side of said image-containing means from said supporting means;
   c. light source means for directing light through said Fresnel lens system and said image-containing means to said projection lens means;
   d. reflecting mirror means for redirecting said light toward said viewing means; and
   e. said projection lens means and said reflecting mirror means being arranged along an axis offset laterally from the central axis of said Fresnel lens system and rearwardly from said viewing means so as to focus both said image and said light from said light source means on said viewing means.

2. A projector as in claim 1 wherein said light source means is offset laterally and rearwardly from said central axis.

3. A projector as in claim 1 wherein said light source means comprises two lamps respectively positioned on opposite sides of said central axis of said Fresnel lens system front and rear with respect to said viewing means.

* * * * *